Patented Aug. 19, 1924.

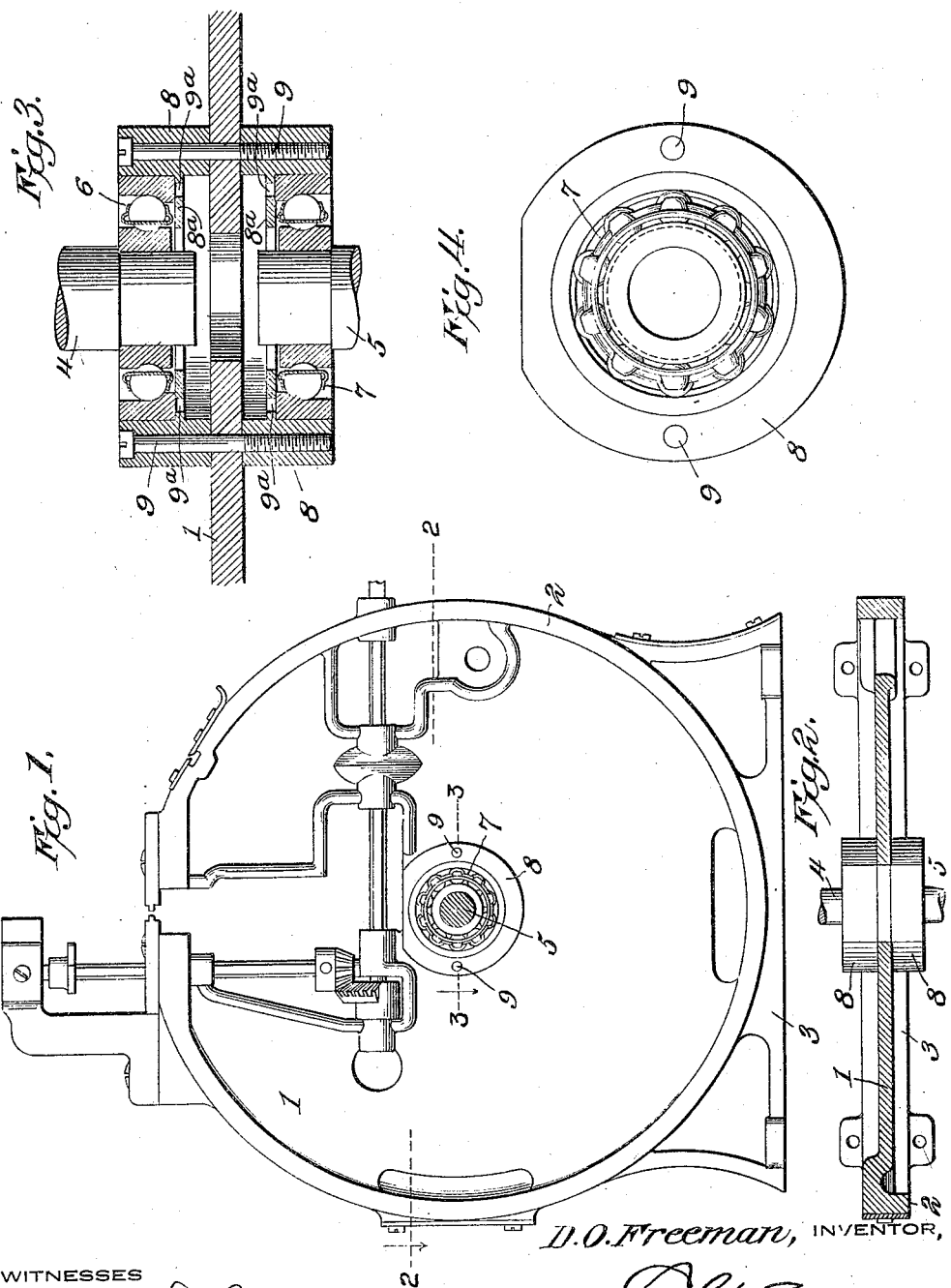

1,505,636

UNITED STATES PATENT OFFICE.

DELBERT OSCAR FREEMAN, OF SCRANTON, PENNSYLVANIA.

ANTIFRICTION BEARING FOR MULTIGRAPHS.

Application filed May 6, 1921. Serial No. 467,392.

*To all whom it may concern:*

Be it known that I, DELBERT O. FREEMAN, a citizen of the United States, residing at Scranton, in the county of Lackawanna and State of Pennsylvania, have invented new and useful Antifriction Bearings for Multigraphs, of which the following is a specification.

This invention has reference to anti-friction bearings for multigraphs to replace existing bearings such as are customarily employed in a multigraph machine, and the object of the invention is to greatly reduce friction so that when once installed and properly adjusted, they will retain their adjustments for an indefinitely long time, besides reducing friction and breakage of type to a minimum, while other parts of the multigraph will wear longer and work easier and freer and produce better reproductions than has heretofore been the case.

The invention is not confined to any particular type of anti-friction bearing, and may be of either the ball or roller type, the invention being particularly directed to the manner of installation, permitting replacements with a minimum of change and labor.

In accordance with the invention, a commercial type of anti-friction bearings is employed, but in order to adapt it to the multigraph machine, there has been devised a housing, which, in conjunction with the anti-friction bearings, constitutes the invention.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention, as expressed in the accompanying claims.

In the drawings:—

Fig. 1 is a face view of an intermediate supporting plate for a multigraph machine, with one of the central shafts shown in cross section.

Fig. 2 is a section on the line 2—2 of Fig. 1.

Fig. 3 is a section on the line 3—3 of Fig. 1, but drawn on a larger scale.

Fig. 4 is a face view of the anti-friction bearings and housing therefor.

Referring to the drawings, there is shown a casting 1, of which one type of multigraph machine includes three, with two of the castings, not shown, constituting end castings, and the third casting constituting an intermediate casting and being the one shown in the drawings.

The attachment of the invention to the end castings will be obvious from this showing.

The casting 1 may be in the form of a disk or plate, and is provided with an annular rim 2 and a base 3 with various parts associated therewith, but these parts do not enter into the invention, and, consequently, are not particularly described.

The type of multigraph machine shown in the drawing includes certain rotatable parts, such as shafts 4 and 5 on opposite sides of the plate 1 and in alignment with each other, and the shafts 4 and 5 are mounted in anti-friction bearings 6 and 7 of known type. Each bearing consists of an inner and outer ring with interposed balls or rollers. The plate 1 sustains two such bearings in alignment on opposite sides of the plate, and the shafts carry supply and printing drums. Heretofore the drum arbors formed by the shafts 4 and 5 have been provided with plain cylindrical bearings carried by plate 1, but the middle bearings heretofore employed to sustain the drum have quickly worn, wherefore the shaft or shafts drop a slight distance from their proper places, allowing the supply drum and skeleton drum to have a play, which causes the other parts of the mechanism to work improperly, and also prevents obtaining a good even impression on the platen, with a consequent uneven reproduction of the type forms.

Each anti-friction bearing is located to receive the shaft 4 or 5, as the case may be, and in order to sustain the anti-friction bearing, there is provided a housing 8 of cylindrical form and traversed by a screw 9 serving to hold the housing in position. In case of the central plate 1, two aligned housings on opposite faces of the plate 1 are provided, and single screws are passed through one housing, or the intervening plate 1 and into the other housing traversing the latter, or nearly so. In this manner the two housings are firmly held in place by a minimum number of screws, and may be applied or removed at will, two screws being usually sufficient to hold both housings with sufficient rigidity.

Each housing 8 has an interior annular ledge or support for the anti-friction bearings 6 or 7 which are secured in position by friction, or by other means, from which position the anti-friction elements may be dislodged and repairs made, as occasion may require.

The ledge 8ª is properly located in spaced relation to the inner and outer faces of the housing to hold the anti-friction bearings flush with the outer face of the respective housing. The flange or ledge 8ª is provided with suitably located perforations 9ª for facilitating the ejection of the anti-friction cages when desired.

With the replacement for rubbing bearings in machines already on the market, the housings may be readily applied by securing the latter by the screws 9. The screws perform the function of holding the housings in place. They do not hold the shafts together. In new machines the housings may be located directly on the center and end plates without the necessity of employing separate housings, and with a minimum amount of machining.

In the event of applying the anti-friction bearings to the castings or plates, no alteration of the machine itself is needed. The installation of the anti-friction bearing is susceptible of changes without material departure from the invention, as, for instance, the association of the housings and race rings as part of each other with the anti-friction bearings placed in the opening provided, and such an arrangement is contemplated by the invention, especially where new installations are provided.

The invention has to do with the replacement of metal slip bearings, with the friction caused thereby, the lost motion, the frequent repairs, and the lack of firmness and stability of the drums and cylinders, for with the anti-friction bearing structure, the bearings are much more delicate and free from friction than has heretofore been the case in a multigraph machine. Lost motion is practically eliminated and the working of the parts is greatly improved because of the firmness and stability of the drums and cylinders when mounted on shafts turning in the anti-friction bearings. This also eliminates frequent repairs, which experience has taught is a large item of expense in the commercial multigraph machine as found upon the market.

The improved bearings are advantageous in that when once in place and the machine is properly adjusted, they will retain their adjustment indefinitely. Reduction in friction and reduction in breakage of type, which at present is enormous, are also very marked, while other parts of the multigraph will wear longer and work easier and freer, and produce better reproductions than otherwise with the standard construction of multigraph.

While the type of anti-friction bearings known as ball bearings is well adapted to use in connection with the invention, roller bearings are susceptible of successful employment in the multigraph machine, and, consequently, the invention contemplates the use of either form of anti-friction bearing, or of any other anti-friction bearing, which will answer the purpose.

Any approved form of dust cap may be employed for the bearing.

What is claimed is:—

1. In a multigraph, the combination with a plate or casting forming a fixed part of the multigraph, and a shaft for sustaining a rotatable drum or cylinder, of a cylindrical housing with an interior ledge spaced from each face thereof, an anti-friction bearing located within the housing and bearing against the ledge, and means for securing the housing to the face of the plate or casting around the end of the shaft with the latter received within the said bearing, the plate or casting closing the inner face of the housing and cooperating therewith to form an oil receptacle between the plate or casting and the ledge.

2. In a multigraph, the combination with a plate or casting forming a fixed part of the multigraph, and a shaft for sustaining a rotatable drum or cylinder, of a housing with an interior ledge spaced from each face thereof, an anti-friction bearing located within the housing and bearing against the ledge and held in position by friction, and arranged flush with the outer wall of the housing, said ledge being provided with perforations, and means for securing the housing to the face of the plate or casting around the end of the shaft with the latter received within said bearing, the plate or casting closing the inner face of the housing and cooperating therewith to form an oil receptacle between the plate or casting and the ledge.

3. An anti-friction bearing assembly for rotatable members of the multigraph, comprising substantially annular housings arranged on opposite sides of a plate or casting forming part of the multigraph, fastening devices extending through one housing and said plate or casting into the other housing, and anti-friction members carried by each housing and adapted to receive the adjacent ends of the shafts.

4. In a multigraph, a plate or casting forming a fixed part of the multigraph, an annular housing with an annular interior ledge, an anti-friction bearing arranged substantially flush within the housing and bearing against the ledge, and means for securing the housing to the face of the plate or casting, consisting of screws passed through holes in the periphery of the housing, said plate or casting closing the inner face of the housing and cooperating therewith to form an oil receptacle between the plate or casting and the ledge.

5. In a multigraph, a plate or casing forming a fixed part of the multigraph, an annular housing with an annular interior ledge, an anti-friction bearing arranged substantially flush within the housing and bearing against the ledge, said bearing consisting of an inner ring and an outer ring with interposed anti-friction elements, the outer ring frictionally engaging the inner wall of the housing, and means for securing the housing to the face of the plate or casing, consisting of screws passed through holes in the housing, said plate or casing closing the inner face of the housing and cooperating therewith to form an oil receptacle between the plate or casting and the ledge.

6. In a multigraph, the combination of a plate or casting forming a fixed part of the multigraph, a pair of shafts arranged in alinement in spaced relation on opposite sides of the plate or casting, substantially annular housings arranged on opposite sides of the plate or casting and surrounding the shafts, each of said housings having an interior ledge spaced from each face thereof, and an outer friction bearing located within the housing and against the ledge, each bearing receiving the end of one of the shafts, and means for securing the housings to the plate or casting by fastening devices which are common to both, said plate or casting closing the inner face of each housing and cooperating therewith to form an oil receptacle between the plate or casting and each ledge.

In testimony that I claim the foregoing as my own, I have hereto affixed my signature.

DELBERT OSCAR FREEMAN.